United States Patent

Haller et al.

[11] Patent Number: 5,575,620
[45] Date of Patent: Nov. 19, 1996

[54] TURBINE BLADE ASSEMBLY

[75] Inventors: Brian R. Haller, West Didsbury; Robert G. Unsworth, Lymm; Geoffrey L. M. Parker, Kenilworth, all of England

[73] Assignee: GEC Alsthom Limited, United Kingdom

[21] Appl. No.: 580,792

[22] Filed: Dec. 29, 1995

Related U.S. Application Data

[63] Continuation of Ser. No. 294,422, Aug. 23, 1994, abandoned, which is a continuation of Ser. No. 49,983, Apr. 20, 1993.

[30] Foreign Application Priority Data

May 15, 1992 [GB] United Kingdom ............... 9210421

[51] Int. Cl.$^6$ ....................................... F01D 9/04
[52] U.S. Cl. ........................ 415/192; 416/223 A
[58] Field of Search ........................ 415/192, 193, 415/194, 195, 181; 416/238, 223 A

[56] References Cited

U.S. PATENT DOCUMENTS

| | | | |
|---|---|---|---|
| 1,475,212 | 11/1923 | Warren et al. | 415/199.5 |
| 2,962,260 | 11/1960 | Foley | 415/223 A |
| 3,995,970 | 12/1976 | Nobuyuki | 415/181 |
| 4,131,387 | 12/1978 | Kazin et al. | 415/181 X |
| 4,470,755 | 9/1984 | Bessay | 415/181 |
| 4,826,400 | 5/1989 | Gregory | 415/181 |
| 5,350,276 | 9/1994 | Gros | 415/168.4 |

FOREIGN PATENT DOCUMENTS

| | | | |
|---|---|---|---|
| 380767 | 12/1907 | France . | |
| 686078 | 7/1930 | France . | |
| 32 37 669 | 4/1984 | Germany | 415/181 |
| 0200796 | 1/1924 | United Kingdom . | |
| 0226203 | 7/1925 | United Kingdom . | |
| 260411 | 11/1926 | United Kingdom . | |
| 0657366 | 9/1951 | United Kingdom . | |
| 0712523 | 7/1954 | United Kingdom . | |
| 712523 | 7/1954 | United Kingdom . | |
| 2162587 | 2/1986 | United Kingdom . | |
| 2 164 098 | 3/1986 | United Kingdom | 415/181 |
| 2199379 | 7/1988 | United Kingdom . | |

OTHER PUBLICATIONS

"The Effect of Flow Twisting on the Characteristics of Guide Rows", G. A. Fillipov, et al, Teploenegetika, 1964, 11, 5, 54–57.

*Primary Examiner*—Edward K. Look
*Assistant Examiner*—Michael S. Lee
*Attorney, Agent, or Firm*—Kirschstein et al.

[57] ABSTRACT

A fixed blade assembly for an axial flow turbine, in which each blade (23) is secured between a radially inner ring (21) and a radially outer ring (22). The trailing edge (25) of each blade is straight and leans at an angle θ away from a radial line (28) from the turbine axis through the inner end of that edge and in the circumferential direction that the suction side (24) of the blade faces. The blades (23) have this (negative) angle of lean in the range 5 degrees to 12 degrees.

4 Claims, 3 Drawing Sheets

TURBINE BLADE ASSEMBLY

This is a request for filing a continuation application under 37 CFR 1.62, of pending prior application Ser. No. 08/294,422, filed on Aug. 23, 1994, which abandoned, which is a request for filing a continuation application under 37 CFR 1.62, of pending prior application Ser. No. 08/049,983, filed on Apr. 20, 1993.

BACKGROUND OF THE INVENTION

1. Field of the Invention

This invention relates to turbine blade assemblies.

In particular, the invention relates to a fixed blade assembly for an axial flow turbine of the type wherein the assembly comprises a radially inner ring, a radially outer ring and a row of circumferentially aligned and spaced apart blades, each blade being secured at an inner end to the inner ring and at an outer end to the outer ring, and each blade having a leading edge, a trailing edge, a pressure side and a suction side.

2. Description of the Related Art

A fixed blade assembly of the type just defined followed by a set of blades attached to the turbine rotor, that is a set or row of moving blades, will constitute a turbine stage and the design of that stage will be concerned with efficiency of conversion of energy in a working fluid, for example steam, passing axially through that stage into mechanical energy in the rotor. The fixed blades are present in order to set up the flow for the moving blades and to optimise the energy extracted, but the fixed blades themselves introduce certain aerodynamic losses.

Known fixed blade assemblies of the type defined herein usually have straight blades, with each blade having a straight trailing edge on a radial line from the turbine axis. We have made and sold turbines with fixed blade assemblies of the type described in which a straight trailing edge of each blade is inclined to the flow, that is the straight trailing edge leans at an angle away from a radial line from the turbine axis through the inner end of that edge and in the direction that the pressure side faces, that is the straight trailing edge has a positive lean angle. We did this in the expectation that the increased fluid flow, from the fixed blade assembly to the inlets of the following row of moving blades, which would be induced at the inner (root) ends of the blades by the straight positive lean of the fixed blades would improve the stage efficiency. However, the hoped for efficiency improvement was not obtained.

An article by G. A. Filipov and Van Chzun-Tsi entitled "The effect of Flow Twisting on the Characteristics of Guide Rows" in Teploenergetika 1964,11,5,54–57, pages 69–73 considers the efficiency of fixed blade assemblies of the type defined herein in which the turbine flow section opens out from the inlet to the outlet of the fixed blade assembly. Consideration is given to straight radial blades, straight blades with positive lean and positively curved blades, that is to say blades which are curved circumferentially outward in the direction that the pressure side faces. The conclusion given is that the best hope for improved efficiency, subject to further experiment, should be the use of blades curved in this manner in combination with the provision of flow twisting at the inlet to the fixed blade assembly which it is suggested can be achieved by profiling the moving and fixed blades of the previous stage. We consider that a major deterrent to investigating this suggestion would be the extra cost in manufacturing a curved blade compared with the usual straight blade.

Published patent application GB 2199379A (General Electric Company) also considers the efficiency of fixed blade assemblies of the type defined herein and, as an alternative to the positively circumferentially curved blades above-mentioned in the Filipov article, proposes negatively circumferentially curved blades, that is to say blades curved circumferentially outward in the direction that the suction side faces. It is said that in this way the potential for low momentum airflow to enter the mainstream airflow is reduced, thereby reducing the magnitude of secondary losses. It is mentioned that these curved blades may additionally be leaned in the direction that the suction side faces, but there is no explanation or discussion of this suggested feature. Again, we consider that a major deterrent to investigating this General Electric Company disclosure would be the extra cost in manufacturing a curved blade compared with the usual straight blade.

SUMMARY OF THE INVENTION

An object of the present invention is to provide a fixed blade assembly of the type herein defined which will achieve improved stage efficiency compared with the use of conventional straight radial blades but without the extra cost in manufacturing curved blades.

We have been surprised to find by experiment that this object of the invention can be achieved with straight blades having negative lean at an angle within a certain range.

According to the invention there is provided a fixed blade assembly for an axial flow turbine, the assembly comprising a radially inner ring, a radially outer ring and a row of circumferentially aligned and spaced apart blades, each blade being secured at an inner end to the inner ring and at an outer end to the outer ring, and each blade having a leading edge, a trailing edge, a pressure side and a suction side, wherein the trailing edge of each blade is straight and leans at an angle away from a radial line from the turbine axis through the inner end of that edge and in the direction that the suction side faces, the blades having the same said angle of lean in the range 5 degrees to 12 degrees. In one arrangement which we have investigated the surfaces of the rings to which the blades are secured have a frusto-conical shape diverging from the turbine axis in the direction from the leading to the trailing edges of the blades.

According to the invention there is also provided an axial flow turbine stage including a fixed blade assembly as defined in the previous paragraph followed in the direction of the flow by a row of moving blades, the moving blades being circumferentially aligned and spaced apart and each secured at its radially inner end to a disc on the turbine rotor.

BRIEF DESCRIPTION OF THE DRAWINGS

The invention will now be described in more detail with reference to the accompanying drawings, in which.

DETAILED DESCRIPTION OF THE PREFERRED EMBODIMENTS

Figure 1:
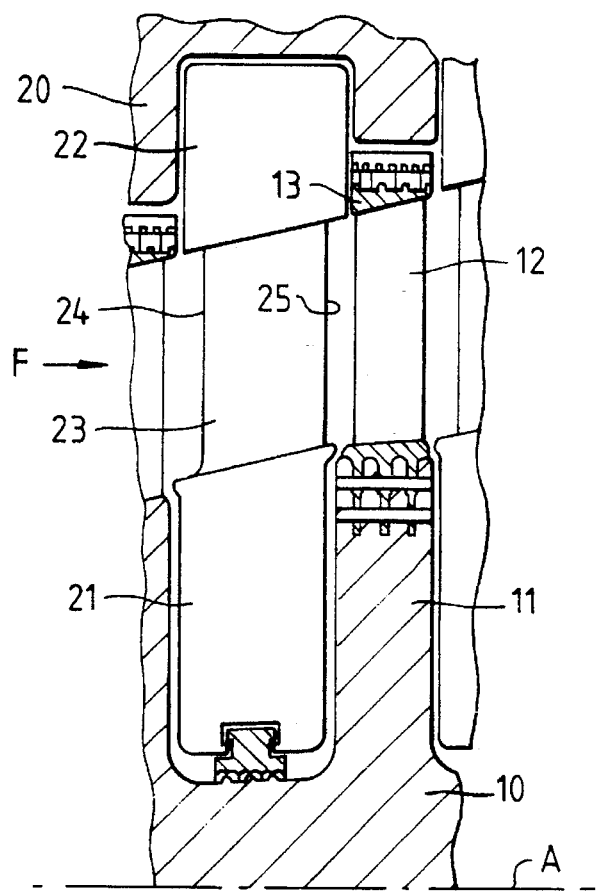
FIG. 1 shows a diagrammatic axial section view of a conventional 'disc and diaphragm' high/intermediate pressure steam turbine stage including a fixed blade assembly of the type to which this invention relates.

Referring now to the drawings, there is shown in FIG. 1 a diagrammatic axial section view of a conventional 'disc and diaphragm' high/intermediate pressure steam turbine stage. The direction of flow F of the working fluid, steam, is approximately parallel to the turbine rotor axis A. The rotor 10 has, for each stage, a disc 11 to which is secured a set or row of circumferentially aligned and spaced apart moving blades 12, the blades 12 having a shroud 13 attached to their radially outer ends. Energy in the steam flowing in the direction F from the front to the rear of the turbine is converted into mechanical energy in the rotor 10. For each stage, a fixed blade assembly precedes the set of moving blades 12 and is secured to the turbine stator 20. This fixed blade assembly comprises a radially inner ring 21, a radially outer ring 22 and a row of circumferentially aligned and spaced apart fixed blades 23, each blade 23 being secured at an inner end to the inner ring 21 and at an outer end to the outer ring 22, and each blade having a leading edge 24 facing the flow and a trailing edge 25. The assembly of blades 23 with the inner and outer rings 21, 22 is known as a diaphragm. The disc and diaphragm stage as shown in FIG. 1 is of the type in which the area between the inner and outer rings 21, 22 orthogonal to the turbine axis A is larger at the fixed blade trailing edges 25 than at the blade leading edges 24. Furthermore, in the example shown in FIG. 1, the surfaces of the rings 21, 22 to which the blades 23 are secured have a frusto-conical shape diverging from the turbine axis A in the direction F from the leading (24) to the trailing (25) edges of the blades 23.

Figure 2:
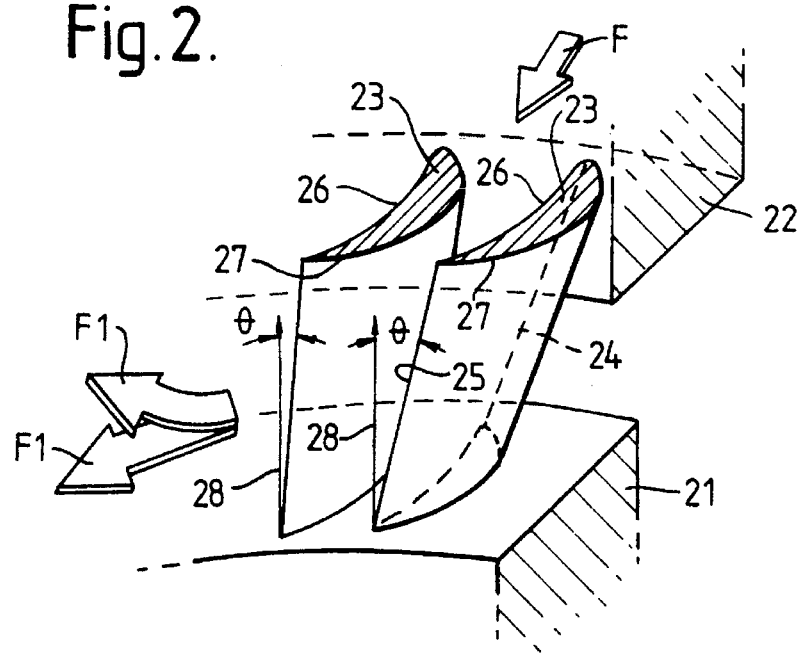
FIG. 2 shows a rear view of part of a fixed blade assembly according to this invention which may be incorporated in a turbine stage as shown in FIG. 1, FIG. 3 graphically shows relative stage efficiency against velocity ratio for three different blade lean angles, FIG. 4 graphically shows relative stage efficiency against blade lean angle for a single velocity ratio, and FIG. 5 graphically shows fixed blade exit specific mass flow against fractional annulus height between the inner and outer rings for the three different blade lean angles.

Referring now to FIG. 2, there is shown a rear view of part of a fixed blade assembly which is of the type described in FIG. 1 and furthermore in which the fixed blades 23 are set into the inner and outer rings 21, 22 in the manner according to this invention. The fixed blades 23 shown in FIG. 2 are each straight, that is to say designed such that the notional aerofoil sections of the blade, each considered orthogonal to a radial line from the turbine axis, have the same shape from the blade inner end to the blade outer end are untwisted from the root end to the tip end and are stacked with the leading edge 24 and the trailing edge 25 each on a straight line. Each blade 23 has a concave pressure side 26 and a convex suction side 27. Each blade 23 is inclined away from the flow of working fluid, that is the straight trailing edge 25 leans at an angle $\theta$ away from a radial line 28 from the turbine axis through the inner end of that edge 25 and in the direction that the suction side 27 faces, that is the straight trailing edge 25 has a negative lean angle $\theta$.

Figure 3:
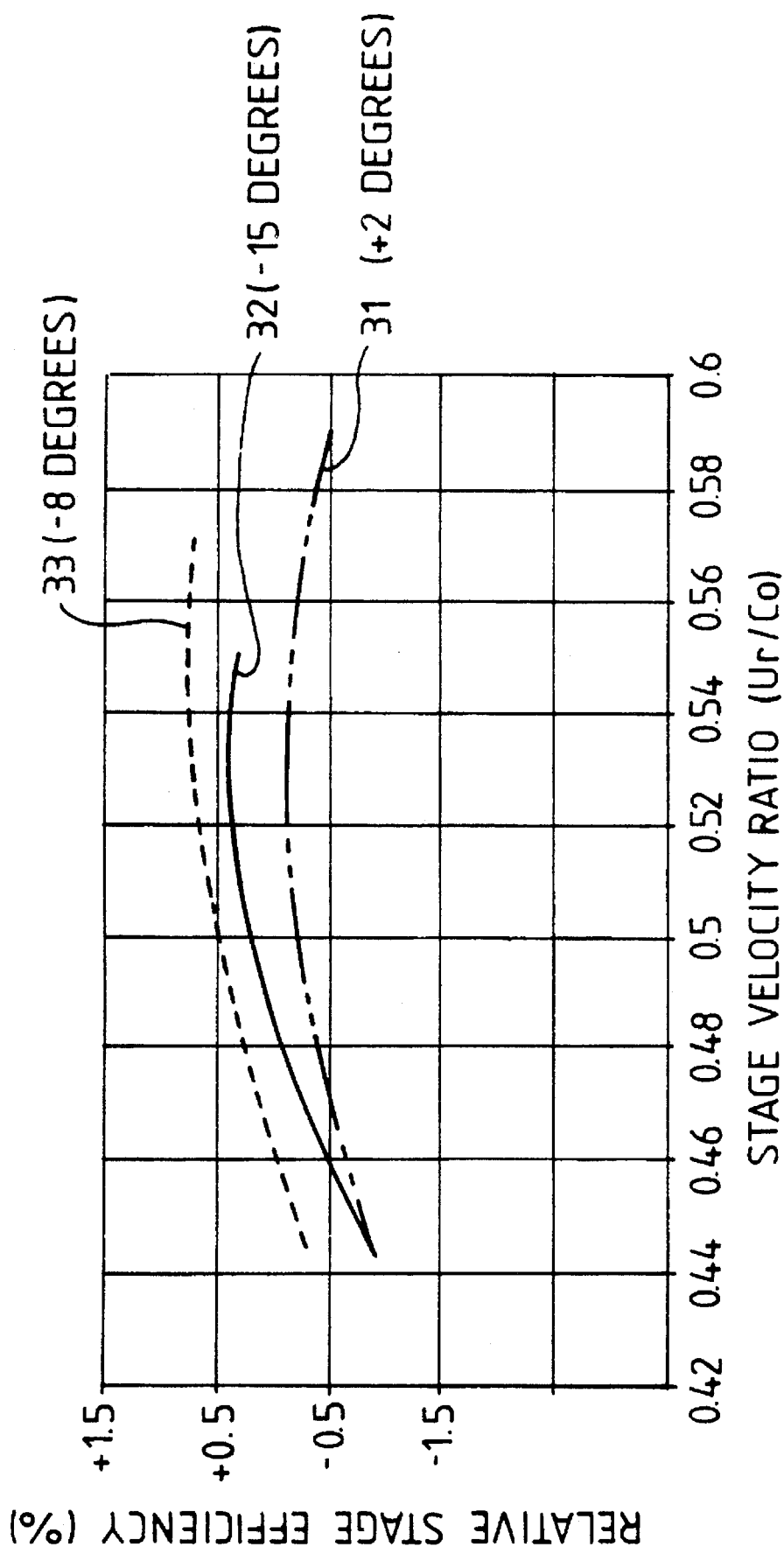

Referring now to FIG. 3 there are shown test results obtained with a model air turbine, having the configuration of the steam turbine as described above with reference to FIG. 1, of relative stage efficiency (percentage) against stage velocity ratio ($U_r/C_o$). $U_r$ is the wheel speed at the root, that is the speed of the disc 11 at the root (radially inner end) of the moving blades 12 of the turbine stage considered and $C_o$ is a measure of the steam velocity, that is the velocity of the moving fluid through that stage; so that the stage velocity ratio $U_r/C_o$ is a measure of the loading of that stage. For the 'disc and diaphragm' type of configuration as described with reference to FIG. 1 the stage efficiency, that is the efficiency of the conversion of energy in the working fluid passing axially through that stage into mechanical energy in the rotor, is generally considered to be an optimum at a value of $U_r/C_o$ equal to about 0.5. The relative stage efficiency shown in FIG. 3 is relative to a datum of 0% which is obtained with radial fixed blades, that is fixed blades having zero degrees lean ($\theta$=0 degrees as shown in FIG. 2). Curves 31, 32 and 33 respectively show the results obtained with straight fixed blades as shown in FIG. 2 having +2 degrees lean, −15 degrees lean and −8 degrees lean. Before conducting these experiments we had expected that a positive lean of the fixed blades, by increasing fluid flow from the fixed blades to the inlets of the following moving blades at the inner (root) ends of the blades would improved the stage efficiency. However, the results for +2 degrees lean (curve 31) produce a negative relative efficiency. Unexpectedly, the results for −15 lean (curve 32) and −8 degrees lean (curve) each show a positive relative efficiency with −8 degrees giving a better result than −15 degrees.

Figure 4:
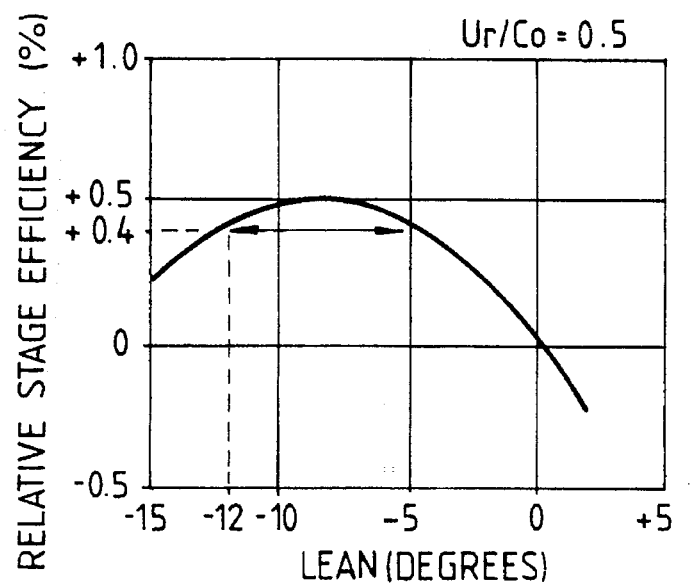

Referring now to FIG. 4, the results shown in FIG. 3 are transferred to a graph of relative stage efficiency against fixed blade lean angle for a single stage velocity ratio $U_r/C_o$=0.5. The graph of FIG. 4 shows a positive relative efficiency of +0.5% at a lean angle of −8 degrees with this efficiency dropping by only 0.1% for an angle of lean in the range −5 degrees to −12 degrees. This very small drop in efficiency of 0.1% leads us to select −5 degrees to −12 degrees as the range defining the scope of our invention.

Figure 5:
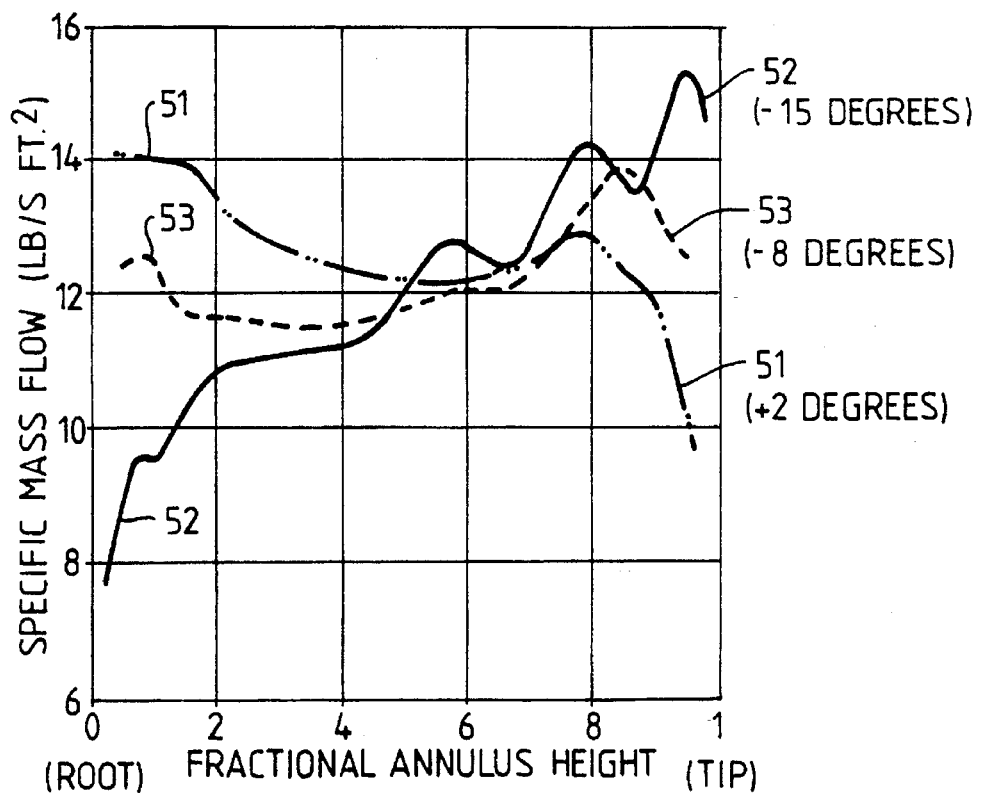

We do not fully understand why we have obtained improved stage efficiency within the range of straight fixed blade negative lean angles as defined above. However, some experimental justification for this improvement is shown in FIG. 5 (now referred to) which is a graph of fixed blade exit specific mass flow against fractional annulus height between the inner and outer rings (21 and 22 respectively as shown in FIG. 1 and 2) for the three different blade lean angles discussed above with respect to FIG. 3. The specific mass flow is shown as lb/s. ft$^2$ (pounds per second per square foot) of air leaving the stage fixed blade assembly at the trailing edges 25 of the blades 23 and therefore entering the following assembly of moving blades 12 in the same model air turbine which produced the experimental results described above with reference to FIGS. 3 and 4. In metric units, 1 lb/s. ft$^2$ equals 4.883 Kg/s.m$^2$ (kilograms per second per square meter). The fractional annulus height is measured from zero at the ring 21 where the inner (root) end of the trailing edge 25 of each fixed blade 23 is secured to unity at the ring 22 where the outer (tip) end of the trailing edge 25 of each fixed blade 23 is secured. Curves 51, 52 and 53 respectively show the results obtained with straight fixed blades as shown in FIG. 2 having +2 degrees lean, −15 degrees lean and −8 degrees lean. Curve 51 shows that for +2 degrees lean there is the most flow at the blade root end but that the flow drops most rapidly towards the blade tip end, so much so that there is probably a very small flow and hence a very large loss in efficiency at the tip itself. Curve 52 shows that for −15 degrees lean the flow is very low at the blade root end and very high at the blade tip end, so that the flow from the fixed blades exit to the moving blades inlet is very non-uniform from the root to the tip of the blades. Curve 53 shows that for −8 degrees lean, in comparison with +2 degrees lean and we think also in comparison with 0 degrees lean conventional radial blades, there is some drop in flow at the blade root end but some increase in flow at the blade tip end and there is a substantially uniform flow from blade root end to tip end. In FIG. 2, the arrows F1 illustrate a component of the exit fluid flow from the fixed blade trailing edges being diverted towards the radially outer (tip) ends of the blades. We consider that this substantial uniformity of specific mass flow at the exit from the fixed blades and thus at the inlet to the following moving blades provides an optimum flow distribution into those moving blades, and a minimum angle of incidence of inlet flow at the moving blade leading edges, resulting in the observed improvement in relative stage efficiency. In other words we consider that the stage efficiency improvement arises primarily by reduction in the losses in the moving blade row rather than in the fixed blade row i.e. there is a 'knock-on' effect.

We specifically intend to incorporate the above described fixed blade assembly in a 'disc and diaphragm' type of turbine stage as described above with reference to FIG. 1, in particular in a low root reaction axial flow steam turbine stage, used in the high pressure/intermediate pressure cylinders, and in the early stages of low pressure cylinders. The description "low root reaction" which refers to comparatively small acceleration through the inner "root" ends of the moving blades, is well understood by those skilled in the art. In our specific intended application, the moving blades are each twisted (that is the moving blade sections are each twisted) from their radially inner (root) end to their radially outer (tip) end. However, we consider that the exact form of the fixed and moving blade sections has only a second order effect, such that the advantage we have achieved with straight fixed blades having negative lean at an angle within the specified range will be retained whatever the exact form of the fixed and moving blade sections. We consider that, within the scope of the invention, the advantage we have achieved may be retained with small variations from the exact form of the fixed blades described above with reference to FIG. 2. For example, the fixed blades may be slightly tapered, that is, the axial width of each fixed blade may vary from root to tip by having a small axial tilt of the leading edge or the trailing edge. Also there may be a small twist of the blade sections from the root end to the tip end of each fixed blades. However, in all cases the trailing edges of the fixed blades are straight, and these fixed blades are not circumferentially curved in the manner described in the prior art Filipov and General Electric disclosures discussed in the introductory part of this patent Specification. We also consider that the improvement in relative stage efficiency which we have achieved would be obtainable if the moving blades were not shrouded, or even if the turbine flow section did not open out from the inlet to the outlet of the fixed blade assembly in the manner shown in FIG. 1 or at all.

I claim:
1. An energy efficient turbine, comprising:
 (a) a low root reaction axial flow stem turbine stage having
  (i) a stator including a fixed blade assembly having a radially inner ring, a radially outer ring and a row of circumferentially aligned and spaced apart fixed blades, each fixed blade being secured at an inner end to the inner ring and at an outer end to the outer ring, and each fixed blade having a leading edge facing a flow of steam through the stage, a trailing edge downstream of the steam flow, a pressure side and a suction side;
  (ii) a rotor rotatable about a turbine axis and including a disc and a row of moving blades following the fixed blade assembly downstream of the steam flow, the moving blades being circumferentially aligned and spaced apart, each moving blade being secured at a radially inner end to the disc;
 (b) means for maximizing the efficiency of conversion of energy in the steam flowing through the stage into mechanical energy, including
  (i) said trailing edge of each fixed blade being straight and having an inner end,
  (ii) said trailing edge of each fixed blade leaning at an angle away from a radial line from the turbine axis through said inner end of that trailing edge,
  (iii) said fixed blades having a direction and angle of lean such that a fixed blade exit specific mass flow of steam is provided which is substantially uniform between said inner and outer rings,
  (iv) said trailing edge of each fixed blade leaning in the direction that the suction side faces, and
  (v) said fixed blades having the same said angle of lean in a range from 5 degrees to 12 degrees.
2. The energy efficient turbine as claimed in claim 1, in which the inner and outer rings bound an area orthogonal to the turbine axis, said area being larger at the trailing edges than at the leading edges of the fixed blades.
3. The energy efficient turbine as claimed in claim 2, in which the rings have surfaces to which the fixed blades are secured, said surfaces having a flusto-conical shape diverging from the turbine axis in the direction from the leading to the trailing edges of the fixed blades.
4. The energy efficient turbine as claimed in claim 1, in which the moving blades have shrouds at their radially outer ends.

\* \* \* \* \*